United States Patent [19]

Komoda

[11] Patent Number: 4,719,058
[45] Date of Patent: Jan. 12, 1988

[54] PROCESS OF PRODUCING MULTIPLE-LAYER FILTER MEDIUM

[75] Inventor: Tadanori Komoda, Toyoake, Japan

[73] Assignee: NGK Insulators, Ltd., Japan

[21] Appl. No.: 849,760

[22] Filed: Apr. 9, 1986

[30] Foreign Application Priority Data

Apr. 12, 1985 [JP] Japan .................... 60-79106

[51] Int. Cl.⁴ .................... B28B 1/26; B29B 17/00
[52] U.S. Cl. .................... 264/38; 210/496; 210/510.1; 264/43; 264/60; 264/302; 264/308
[58] Field of Search .................... 264/38, 37, 308, 302, 264/43, 60; 210/510.1, 496

[56] References Cited

U.S. PATENT DOCUMENTS

| | | | |
|---|---|---|---|
| 1,963,030 | 6/1934 | Powell | 264/37 |
| 3,243,860 | 4/1966 | Whittaker et al. | 210/510.1 X |
| 3,274,307 | 9/1966 | Bergstein et al. | 264/37 |
| 3,309,438 | 3/1967 | Bergstein et al. | 264/37 |
| 4,088,576 | 5/1978 | Mott | 210/510.1 X |
| 4,356,215 | 10/1982 | Auriol et al. | 427/244 |
| 4,606,805 | 8/1986 | Bon | 264/60 X |
| 4,647,376 | 3/1987 | Galaj | 210/510.1 X |

FOREIGN PATENT DOCUMENTS 56-8643 2/1981 Japan .

*Primary Examiner*—Philip Anderson
*Attorney, Agent, or Firm*—Parkhurst & Oliff

[57] ABSTRACT

A process of producing a multiple-layer filter medium comprising a porous support and a filtering layer formed on one of opposite surfaces of the porous support. The process includes the steps of: immersing the porous support in a liquid, to fill pores in the porous support with the liquid and thereby remove a gas from the pores; preparing a suspension containing particles to form the filtering layer; disposing the porous support such that the above-indicated one surface is exposed to a flow of the suspension, and partially defines a conduit through which the suspension flows; holding the other surface of the porous support under a first pressure lower than a second pressure acting on the above-indicated one surface, and effecting the flow of the suspension in contact with the above one surface for a predetermined time, to permit the particles in the flow to be deposited on the above one surface, thereby forming the filtering layer; draining the conduit of the suspension, and introducing into the conduit a gas having a third pressure higher than the first pressure, and to thereby remove aqueous components from the porous support and the filtering layer; and firing the porous support and the filtering layer.

13 Claims, 1 Drawing Figure

U.S. Patent  Jan. 12, 1988  4,719,058
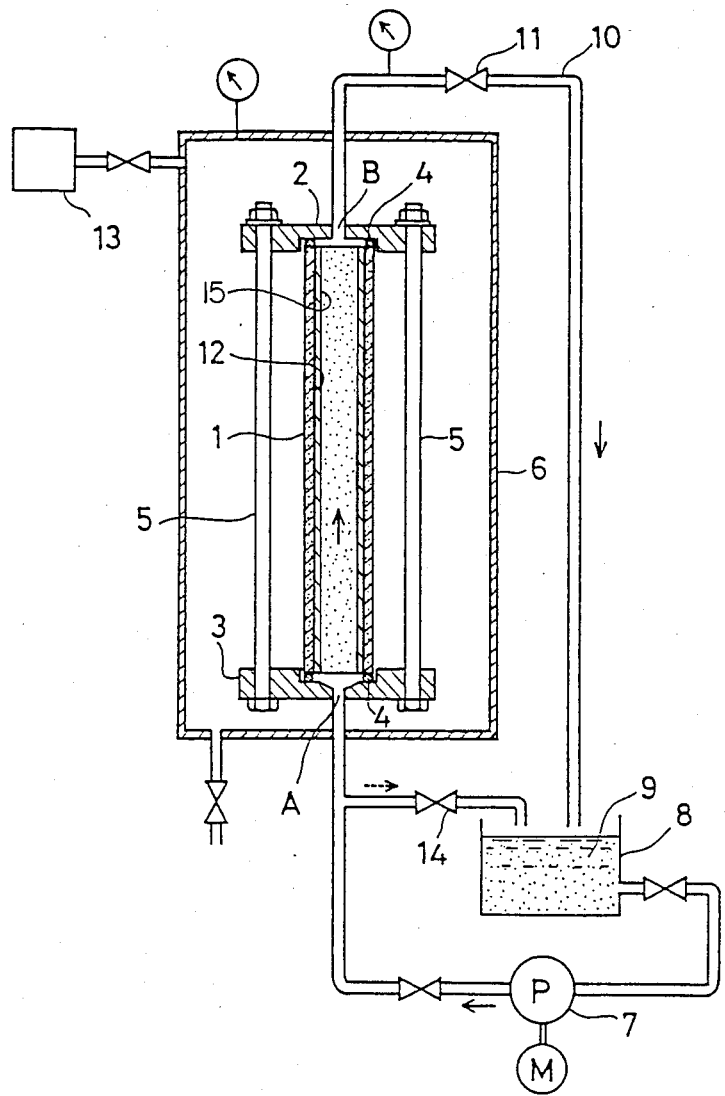

PROCESS OF PRODUCING MULTIPLE-LAYER FILTER MEDIUM

BACKGROUND OF THE INVENTION

1. Field of the Art

The present invention relates to a process of producing multiple-layer filter medium consisting of a porous support body and at least one filtering layer which is formed on the support body and which has minute pores.

2. Related Art Statement

There is known a multiple-layer filter medium which consists of a porous support body of tubular or other shapes formed of a metallic or ceramic material and having a high mechanical strength, and at least one filtering layer formed of a material similar to that of the porous support body and having minute pores. The filtering layer or layers is/are formed integrally on one of opposite surfaces of the porous support body (on the inner or outer surface of the tubular support body). This type of filter medium has a relatively low resistance to a flow of a liquid to be filtered, and is very much effective to separate fine solid particles from a large amount of flow of the liquid. The filter medium having a tubular porous support body is produced, for example, by a process disclosed in Japanese Patent Application published in 1981 (for opposition puprpose) under Publication No. 56-8643. This process includes the steps of: preparing a slurry for forming the filtering layer; introducing the slurry into the tubular porous support body; rotating the support body so that the slurry is spread over the inner surface of the support body, by a centrifugal force, while at the same time holding the outer surface of the support body under a pressure which is lower than that acting on the inner surface, so that a layer of the slurry tightly adheres to the inner surface of the support body; and firing the porous support body with the layer of the slurry on its inner surface. An alternative process is known according to U.S. Pat. No. 4,356,215. This process includes the steps of: preparing two masses of coating suspension which contain mineral particles having different sizes, respectively; applying one of these two masses of coating suspension to a surface of the porous support body, to form a first coating layer, heating and drying the first coating layer, and subsequently firing the porous support body with the first coating layer; and applying the other masses of coating suspension to the fired first coating layer to form a second coating layer, heating and drying the second coating layer, and finally firing the porous support with the first and second coating layers.

PROBLEMS SOLVED BY THE INVENTION

However, the two processes introduced above suffer from inconveniences, such as relatively high tendency of the filtering or coating layer having local pin holes, which are pores having a comparatively large size, and difficulty in obtaining uniform or even thickness of the filtering layer. Further, the former process using a centrifugal force to form the filtering layer is disadvantageous in that the process requires comparatively complicated and large-sized equipment.

SUMMARY OF THE INVENTION

It is therefore an object of the present invention to provide a process of producing a multiple-layer filter medium, wherein a filtering layer is formed with a minimum possibility of pin holes being developed therein, and with a uniform thickness, and which is practiced by equipment of a simple construction.

In accordance with the present invention, there is provided a process of producing a multiple-layer filter medium comprising a porous support and a filtering layer formed on one of opposite surfaces of the porous support, the process comprising the steps of: (a) immersing the porous support in a liquid, thereby filling pores in the porous support with masses of the liquid, so as to remove a gas from the pores; (b) preparing a suspension containing particles of a material for the filtering layer; (c) disposing the porous support such that the above-indicated one surface is exposed to a flow of the suspension, this one surface partially defining a conduit through which the suspension flows; (d) holding the other of the opposite surfaces of the porous support under a first pressure lower than a second pressure acting on the above-indicated one surface, and effecting the flow of the suspension in contact with the above one surface for a predetermined time, to permit the particles of the above-indicated material to be deposited on the above-indicated one surface and thereby form an unfired layer for the filtering layer; (e) draining the conduit of the flow of the suspension, and introducing into the conduit a gas having a third pressure higher than the second pressure, and to thereby remove aqueous components from the porous support and the unfired layer of the above-indicated particles; and (f) firing the porous support and the unfired layer to produce the multilayer filter medium having the filtering layer.

In the process of the present invention described above, the minute pores in the porous support are filled with the liquid, whereby the gas which has existed in the pores is removed. Thus, the porous support with the liquid masses filling its pores is obtained. The thus obtained porous support is exposed at its one surface to the suspension which flows through the conduit air-tightly connected to the opposite end portions of the porous support, such that the suspension flows in contact with the above-indicated one surface. Since the pores in the porous support are filled with the liquid, the suspension will not penetrate through the wall of the porous structure immediately after the suspension comes into contact with the above-indicated one surface. In other words, the liquid masses filling the porous support prevent a filtering action of the porous wall of the porous support with respect to the suspension containing the particles for the filtering layer, thereby avoiding a rapid formation of a layer of the particles suspended in the suspension, immediately after the exposure of the above-indicated one surface to the flow of the suspension. Only after the first pressure acting on the other surface of the porous support is made lower than the second pressure acting on the above one surface, the suspension flowing through the conduit (which is partially defined by the above-indicated one surface) is permitted to start active penetration or diffusion through the wall of the porous support. That is, the commencement of formation of the unfired layer for the filtering layer may be controlled by adjusting the timing at which the first pressure is made lower than the second pressure. Therefore, the formed unfired layer for the filtering layer may be given an uniform thickness over its entire area, namely, over the entire area of the above-indicated one surface of the porous support. Moreover, the liquid masses filling the porous support substantially eliminate the possibility of local pin holes being created in the unfired layer for the filtering layer. Furthermore, the particles in the suspension are contacted with the above-indicated one surface of the porous support while the particles are moved with a flow of the suspension through the conduit, whereby otherwise possible sedimentation of the particles in the suspension, and consequent uneven thickness of the unfired layer may be effectively avoided.

According to one advantageous feature of the invention, the porous support is a tubular body whose inner surface defines a bore through which the suspension is caused to flow upward while the tubular body is positioned upright. In this case, the filtering layer is formed on the inner surface of the tubular body.

According to another feature of the invention, the porous support is a tubular body whose outer surface partially defines an annular space through which the suspension is caused to flow upward while the tubular body is positioned upright. In this case, the filtering layer is formed on the outer surface of the tubular body.

According to a further advantageous feature of the invention, the first pressure is made lower than the second pressure after an entire area of the above-indicated one surface of the porous support has been exposed to the flow of the suspension. This permits uniform thickness of the unfired layer for the filtering layer over its entire area.

According to a still further feature of the invention, the conduit forms a part of a closed circuit, and the suspension is recirculated through the closed circuit, until the unfired layer for the filtering layer is given a predetermined thickness.

According to a yet further feature of the invention, the first pressure is a reduced pressure lower than an atmospheric pressure. In this case, the gas having the third pressure may be an ambient air. Alternatively, the first pressure may be an atmospheric pressure. In this case, a compressed air may be used as the gas having the third pressure.

According to yet another feature of the invention, each of the porous support and the filtering layer is formed of a mass of powder substantially consisting of particles of metals, organic substances or ceramics. For increased resistance to corrosion and wear of the filter medium, it is advantageous to use a powder of ceramics, preferably alumina, in particular, alpha-alumina.

It is further advantageous that the porous support and the filtering layer are formed of particles of sustantially the same material, from the standpoint of coherence of the porous support and the filtering layer to be obtained by firing thereof. For example, a fired porous support in the form of tubes or plates is preferably formed of a powder of alumina, silica, mullite or other ceramics having a grain size of 5–200 microns. Particularly, it is preferred to use a porous support which is formed of a mass of powder whose substative portion consists of alpha-alumina, and which is fired at a temperature in the neighborhood of 1550° C. On the other hand, the filtering layer is formed of ceramic powders such as alumina powder whose grain size is selected depending upon the desired pore size of the filtering layer. For example, the grain size of the ceramic material for the filtering layer is selected within a range of 0.5–10 microns. To assure the desired pore size of the filtering layer, it is particularly preferred to use alumina powder prepared in Bayer process and a firing temperature around 1450° C.

With the grain size of the ceramic powder material of the porous support selected to be larger than that of the filtering layer, the size of the pores in the porous support is accordingly larger than that of the filtering layer. This selection of the grain sizes leads to a reduced loss of the pressure applied to the porous support, and facilites the deposition of the ceramic particles for the filtering layer on the surface of the porous support.

The porous support may be immersed in water, alcohol or other suitable liquid, to remove gases from the pores in the porous support. The porous support may be oscillated or vibrated within the liquid. For more effective degassing of the porous support (removal of gas from the pores), it is advantageous to hold the liquid and the porous support immersed in the liquid, at a suitable elevated temperature, preferably at the boiling point of the liquid, and/or under a reduced pressure.

BRIEF DESCRIPTION OF THE DRAWING

The foregoing and other objects, features and advantages of the present invention will become more apparent from reading the following detailed description of the invention, when considered in the accompanying drawing, in which a single FIGURE is a schematic elevational view in vertical cross section of an example of a device used to practice one embodiment of a process of the invention.

DETAILED DESCRIPTION OF THE INVENTION

Referring to the single FIGURE of the accompanying drawing, there is shown a porous support in the form of a tubular body 1 which is processed as described below, before installation in the device shown in the FIGURE. Initially, the porous tubular body 1 is immersed in a pool of water, and the pool is boiled, so that the pores in the wall of the tubular body 1 are filled with the water. Thus, the gas which have existed in the pores are removed. Subsequently, the tubular body 1 is cooled in air. This tubular body 1 is positioned upright in a pressure vessel 6, and is supported at its opposite upper and lower ends by respective upper and lower brackets 2, 3 retained in the pressure vessel 6. O-rings 4 are disposed in the brackets 2, 3 to secure fluid-tightness of the upper and lower ends of the tubular body 1 with respect to the brackets 2, 3. The tubular body 1 is held in position by fixing the upper and lower brackets 2, 3 to each other by clamp bolts 5. The tubular body 1 communictes at its upper and lower openings with an outlet B and an inlet A which are formed in the respective upper and lower brackets 2, 3. The inlet A and outlet B are connected to a closed hydraulic circuit which includes a pump 7, and a reservoir 8 for storing a pool of a suspension 9 which contains particles of a selected material for forming a filtering layer on an inner surface 12 of the porous tubular body 1. The tubular body 1 forms a part of a conduit of the hydraulic circuit through which the suspension 9 flows. With the pump 7 operated, the suspension 9 fed from the reservoir 8 flows through the tubular body 1 in an upward direction from the inlet A toward the outlet B (from the lower open end toward the upper open end of the tubular body 1). The outlet B is connected to a discharge line 10 which leads to the reservoir 8. The discharge line 10 incorporates a throttle valve 11 which is placed in its fully open position until the tubular body 1 is filled with the suspension 9, that is, until the flow of the suspension 9 reaches the upper end of the tubular body 1, or until the entire area of the inner surface 12 is exposed to the suspension 9. When the tubular body 1 has been filled with the suspension 9, a vacuum pump 13 connected to the pressure vessel 6 is started to evacuate the vessel 6 to a predetermined reduced pressure (first pressure), whereby the outer surface of the tubular body 1 is held under the reduced first pressure. At the same time, the throttle valve 11 is operated to a restricting position while the pump 7 is kept operated. In this condition, the suspension 9 is caused to flow upward through the tubular body 1, while exerting a suitable fluid pressure (second pressure) to the inner surface 12 of the tubular body 1. For example, this second pressure within the tubular body 1 is selected within a range of 2-5 $Kg/cm^2$. As is apparent from the above description, there exists a pressure difference between the first pressure outside the tubular body 1 and second pressure within the tubular body 1. As a result, a portion of the suspension 9 penetrates or diffuses through the porous wall of the tubular body 1 from its inner surface 1 toward the outer surface, while the suspension 9 flows through the tubular body 1. Consequently, the solid particles suspended in the suspension flow 9 are partly deposited on the inner surface 12 of the tubular body 1, whereby a green or unfired layer of the particles is formed on the inner surface 12, as indicated at 15.

The suspension 9 leaving the tubular body 1 is returned to the reservoir 8 through the discharge line 10. The end of the discharge line 10 remote from the tubular body 1 is positioned above the surface of the suspension pool 9. In this manner, the suspension 9 is recirculated through the closed hydraulic circuit, with the pump 7. Since the suspension 9 flows upward through the porous tubular body 1, the solid particles in the flow of the suspension 9 will not be sedimented. Hence, the particles in the suspension 9 are deposited on the inner surface 12 with a uniform density over the entire length of the tubular body 1 (over the entire area of the inner surface 12). Thus, the particles suspended in the suspension 9 are formed as the layer 15 having substantially the same thickness as viewed in the direction of flow of the suspension 9. The thickness of this layer 15 is adjusted as desired, by selecting a pressure differential between the first and second pressures acting on the opposite outer and inner surfaces of the tubular body 1, and the length of time during which the inner surface 12 is exposed to the flow of the suspension 9. When the desired thickness of the layer of the particles is obtained, the pump 7 is turned off, and the tubular body 1 and the associated lines of the hydraulic circuit are drained by fully opening the throttle valve 11 and a throttle valve 14. This second throttle valve 14 is provided in a line one end of which communicates with the inlet A and the other end of which is positioned above the surface of the suspension pool 9 in the reservoir 8. With the throttle valves 11, 14 kept open, the ambient air is introduced into the tubular body 1, whereby the inside of the tubular body 1 is held under the atmospheric pressure (third pressure). In the meantime, the vacuum pump 13 is kept operated to maintain the predetermined reduced pressure (first pressure) in the pressure vessel 6. In this condition wherein the third pressure within the tubular body 1 is higher than the first pressure outside the tubular body 1, aqueous components existing in the porous structures of the tubular body and the unfired layer of the particles on the inner surface 12 are sucked out, due to the difference between the third and first pressures on the opposite sides of the wall of the body 1. The removed aqueous components stay in the bottom portion of the pressure vessel 6. The vacuum pump 13 is turned off after the above-indicated removal of the aqueous components is conducted for a suitable period. The porous tubular body 1 with the green filtering layer 15 formed on the inner surface 12 is taken out of the pressure vessel 6, dried and then fired at a sintering temperature suitable for firing the green filtering layer 15. Thus, a multi-layer filter medium is obtained in the form of the porous tubular body 1 whose inner surface 12 is coated with the filtering layer 15.

EXAMPLES

The porous tubular body 1 was formed of a powder material whose major component consists of an alumina powder mass of average grain size of 60 microns. The fired tubular body 1 had an outside diameter of 30 mm, an inside diameter of 24 mm, a length of 500 mm, and a maximum pore size of 15 microns. Then, the porous tubular body 1 was immersed in boiling water and left therein for three hours to remove the gas from the porous structure of the tubular body 1. A suspension for a filtering layer 15 to be formed on the tubular body 1 was prepared as a 60%-water slurry which contains a powder mass mixed with an organic binder. A major component of the powder mass was an alumina powder of an average grain size of 1 micron. The thus prepared suspension was used to form the filtering layer 15 on the porous tubular body 1, namely, to produce a multi-layer filter medium, according to the process of the invention described above, and by using the device described referring to the FIGURE. More specifically, the pressure vessel 6 was maintained at a reduced pressure of 730-740 mmHg, and the suspension be introduced into the tubular body 1 was pressurized to 2 $Kg/cm^2$. The inner surface 12 of the tubular body 1 was kept in contact with the flow of the suspension for one minute and 20 seconds. The above-indicated reduced pressure was maintained during a five-minute operation to suck out the aqueous components from the porous tubular body 1 and the green filtering layer 15 on the inner surface of the body 1, after the tubular body 1 had been drained of the suspension and exposed to the atmospheric pressure. The particulars of the filtering layer 15 of the multi-layer filter medium thus prepared according to the invention are given in Table 1.

Table 1 also indicates the particulars of the filtering layer 15 of a multi-layer filter medium which was prepared as a comparative example, without removal of the gas from the porous tubular body 1 used in the above example according to the invention. The conditions for the subsequent steps practiced for this comparative example are the same as indicated above, except that the inner surface 12 was exposed to the suspension flow for one minute. Table 1 further indicates the particulars of the filtering layer of a conventional filter medium which was prepared according to a known process which includes: plugging the lower end of a porous tubular body fired at 1750° C. which is positioned at about 70 degrees with respect to the vertical; pouring the water suspension of alumina into the tubular body through its upper open end; removing the plug to drain the tubular body of the suspension after one minute and 30 seconds; drying and firing the tubular body with the formed green filing layer.

TABLE 1

| PROCESS PRACTICED | | INVENTION | COMPARATIVE | KNOWN |
| --- | --- | --- | --- | --- |
| Thickness of | Upper part | 70 | 60 | 55 |
| Filtering Layer | Lower part | 73 | 80 | 90 |
| (in micron) | Average | 72 | 70 | 72 |
| Max. Pore Size (in micron) | | 1 | 7 | 14 |
| Average Grain | Upper part | 1.0 | 1.0 | 0.9 |
| Size (in micron) | Lower part | 1.0 | 1.0 | 2.0 |
| Number of Pin Holes | | 0 | 5 | 10 |

To measure the maximum pore size of the filtering layer indicated in Table 1, the produced filter mediums were immersed in water. The pore size was obtained from a surface tension of water in the pores in the filtering layer, in relation to an air pressure applied to the water from the pores. To measure the thickness and grain size of the filtering layer, the filter media were cut transversely at two points 20 mm away from their opposite longitudinal ends of the medium. The thickness and the grain size at the cut surfaces were measured with a stereoscopic microscope. The filter media were further cut longitudinally, to count the number of pin holes of more than about 100 microns which were visible on the cut surfaces.

As is apparent from the foregoing description, the comparative example whose filtering layer was formed as a result of contact with the suspension, is improved in the uniformity of thickness of the filtering layer over the conventional medium according to the known method. The instant filter medium prepared according to the process of the present invention is significantly improved in the uniformity of thickness of the filtering layer 15 and in the number of pin holes, over the comparative and conventional examples. These improvements are derived from the removal of the gas from the pores in the porous support member (in the form of a tubular body), namely, from filling the pores with the water in which the porous support member is immersed, before the porous support member is exposed to the suspension for forming the filtering layer.

While the present invention has been described in its preferred embodiment, it is to be understood that the invention is by no means confined to the details of the embodiment but may be otherwise embodied. For example, it is possible to start applying a small pressure differential between the inner and outer surfaces of the porous tubular body 1, before the surface of the suspension 9 flowing upward through the tubular body 1 has reached the upper end of the tubular body 1. In other words, the vacuum pump 13 may be turned on while the flow of the suspension 9 pumped out from the reservoir 8 is moving along the inner surface 12 of the tubular body 1. For uniform thickness and grain size of the filtering layer, however, it is preferred to establish the predetermined pressure differential only after the tubular body 1 has been entirely filled with the suspension 9.

In the illustrated process of the invention, the vacuum pump 13 is used to produce a reduced pressure (first pressure) within the pressure vessel 6, so as to establish the pressure differential on the opposite surfaces of the tubular body 1, for the purpose of forcing the green filtering layer 15 onto the inner surface 12 and for removing the aqueous components from the tubular body 1 and the green filtering layer. This reduction of the pressure by the vacuum pump 13 is preferably for improved uniformity or evenness in the thickness of the filtering layer, since the reduced pressure acts evenly on the entire outer surface of the tubular body 1. However, the vacuum pump 13 may be eliminated. In this case, only the pressure of the suspension 9 developed by the pump 7 contributes to establishing a differential between the first pressure (acting on the outer surface of the body 1) and the second pressure (acting on the inner surface 12), for forced deposition of the green or unfired filtering layer on the inner surface 12. Further, a pressure differential for removal of the aqueous components from the tubular body 1 and the green filtering layer may be established by introducing into the tubular body 1 a suitable pressurized gas (such as compressed air) whose pressure (third pressure) is higher than the first pressure, i.e., the atmospheric pressure acting on the outer surface of the body 1.

While the illustrated embodiment is applied to form a filtering layer on the inner circumferential surface of a porous support in the form of the tubular body 1, the principle of the invention is equally applicable to the formation of a filtering layer on the outer circumferential surface of a tubular porous support, or on either one of opposite surfaces of any porous hollow members of any transverse cross sectional shapes, or any planar or curved porous plates.

As described above, the process of the present invention is capable of producing a multiple-layer filter medium coated at one of its opposite surfaces with a filtering layer which has a uniform thickness and is substantially free of pin holes. The filter media produced according to the invention are suitably used for filtration of bacteria, food stuff, etc., and in bioreactors, or other equipment for processing of various liquids and gases. Further, it is significant to note that a device used to practice the instant process is simpler in construction than a conventional centrifugal coater. Moreover, the instant process facilitates simultaneous formation of filtering layers on two or more porous support members.

What is claimed is:

1. A process of producing a multiple-layer filter medium comprising a porous support and a filtering layer formed on one surface of said porous support, comprising the steps of:

providing a porous support having a plurality of pores filled with a gas;

immersing said porous support in an aqueous liquid, thereby filling said pores in said porous support with said aqueous liquid, so as to remove said gas from said pores;

preparing a suspension containing particles of a ceramic powder for said filtering layer;

disposing said porous support such that said one surface is exposed to a flow of said suspension, said one surface partially defining a conduit for the flow of said suspension;

holding an opposite surface of said porous support under a first pressure lower than a second pressure acting on said one surface, and effecting said flow of said suspension in contact with said one surface for a predetermined time, to permit said particles to be deposited on said one surface and thereby form an unfired layer for said filtering layer;

draining said conduit of the flow of said suspension, and introducing into said conduit a gas having a third pressure higher than said first pressure, and to thereby remove aqueous components from said porous support and said unfired layer of said particles; and firing said porous support and said unfired layer to produce the multiple-layer filter medium having said filtering layer.

2. The process of claim 1, wherein said porous support is a tubular body having an inner surface which serves as said one surface and which defines a bore, said suspension flowing upward through said bore while said tubular body is positioned upright.

3. The process of claim 1, wherein said porous support is a tubular body having an outer surface which serves as said one surface and which partially defines an annular space around said tubular body, said suspension flowing upward through said annular space while said tubular body is positioned upright.

4. The process of claim 1, wherein said first pressure is made lower than said second pressure after an entire area of said one surface of said porous support has been exposed to said suspension.

5. The process of claim 1, wherein said conduit forms a part of a closed circuit, and said suspension is recirculated through said closed circuit, until said unfired layer for said filtering layer is given a predetermined thickness.

6. The process of claim 1, wherein said first pressure is a reduced pressure lower than an atmospheric pressure.

7. The process of claim 6, wherein said gas having said third pressure is an ambient air.

8. The process of claim 1, wherein said first pressure is an atmospheric pressure, and said gas having said third pressure is an compressed air.

9. The process of claim 1, wherein each of said porous support and said filtering layer is formed of a mass of particles substantially consisting of particles of alumina.

10. The process of claim 9, wherein a grain size of said particles of alumina of said porous support is larger than that of said filtering layer.

11. The process of claim 9, wherein said grain size of said particles of alumina of said porous support is within a range of 5–200 microns, while that of said filtering layer is within a range of 0.5–10 microns.

12. The process of claim 1, wherein said porous support is immersed in said aqueous liquid to remove said gas from said pores while said aqueous liquid is boiled.

13. A process for producing a multiple-layer filter medium comprising a tubular porous support having a filtering layer on one surface thereof, comprising the steps of:

providing a tubular porous support having a plurality of pores filled with a gas;

immersing said porous support in an aqueous liquid, thereby filling said pores with the aqueous liquid and removing said gas from said pores;

positioning the porous support within a pressure vessel such that one surface of said porous support constitutes a part of a closed hydraulic circuit which includes a pump and a reservoir;

providing a suspension containing particles of a ceramic powder for said filtering layer in said reservoir;

exposing said one surface of said porous support to a portion of said suspension;

evacuating said pressure vessel to exert a reduced, first pressure on an opposite surface of said porous support;

causing said suspension to flow through said hydraulic circuit for a predetermined time to permit said particles to be deposited on said one surface of the porous support thereby forming an unfired layer on said one surface, said suspension exerting a second pressure on said one surface which is higher than said first pressure;

draining said suspension from said hydraulic circuit after said predetermined time has elapsed;

introducing a gas having a third pressure into said hydraulic circuit to remove aqueous components from said porous support and said unfired layer, said third pressure being higher than said first pressure; and firing said porous support and unfired layer to produce a multiple-layer filter medium having a filtering layer on one surface of the porous support.

* * * * *